(12) United States Patent
Chen et al.

(10) Patent No.: US 10,390,177 B2
(45) Date of Patent: Aug. 20, 2019

(54) ALERT FOR LEFT-BEHIND MOBILE DEVICE

(71) Applicant: Ford Global Technologies, LLC, Dearborn, MI (US)

(72) Inventors: Yifan Chen, Ann Arbor, MI (US); Kwaku O. Prakah-Asante, Commerce Township, MI (US); Basavaraj Tonshal, Northville, MI (US); Aiswarya Kolisetty, Tamil Nadu (IN); Hsin-Hsiang Yang, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 16/060,796

(22) PCT Filed: Dec. 9, 2015

(86) PCT No.: PCT/US2015/064580
§ 371 (c)(1),
(2) Date: Jun. 8, 2018

(87) PCT Pub. No.: WO2017/099734
PCT Pub. Date: Jun. 15, 2017

(65) Prior Publication Data
US 2018/0359604 A1    Dec. 13, 2018

(51) Int. Cl.
*H04W 24/00* (2009.01)
*H04W 4/02* (2018.01)
(Continued)

(52) U.S. Cl.
CPC .......... *H04W 4/023* (2013.01); *G01S 5/0054* (2013.01); *G01S 5/02* (2013.01); *G01S 11/06* (2013.01);
(Continued)

(58) Field of Classification Search
CPC ..... H04W 4/023; H04W 4/029; H04W 4/025; H04W 52/0225; H04W 52/0274; H04W 64/003; G01S 5/0054; G01S 11/06
(Continued)

(56) References Cited

U.S. PATENT DOCUMENTS 8,787,006 B2    7/2014  Golko et al.
9,189,879 B2 *  11/2015  Filev ................... B60W 50/10
(Continued)

FOREIGN PATENT DOCUMENTS

CN    103368618 A    10/2013
GB    2518404 A      3/2015

OTHER PUBLICATIONS

Asis Nasipuri, et. al., "A Directionality Based Location Discovery Scheme for Wireless Sensor Networks", In Proceedings of the 1st ACM International Workshop on Wireless Sensor Networks and Application (WSNA 2002), ACM, New York, NY, pp. 105-111 (7 pages).
(Continued)

*Primary Examiner* — Marceau Milord
(74) *Attorney, Agent, or Firm* — Brandon Hicks; Bejin Bieneman PLC

(57) ABSTRACT

A vehicle system includes a communication device programmed to pair with a mobile device and a processing device programmed to periodically transmit, to the mobile device, a present location signal representing a present location of the mobile device. The processing device is further programmed to detect a vehicle shutdown and transmit a final location signal to the mobile device, the final location signal representing a final location of the mobile device and a shutdown flag.

19 Claims, 3 Drawing Sheets

(51) Int. Cl.

| | | |
|---|---|---|
| *G01S 11/06* | (2006.01) | |
| *G01S 5/00* | (2006.01) | |
| *G01S 5/02* | (2010.01) | |
| *H04W 4/40* | (2018.01) | |
| *H04W 4/029* | (2018.01) | |
| *H04W 52/02* | (2009.01) | |
| *H04W 64/00* | (2009.01) | |

(52) U.S. Cl.
CPC ........... *H04W 4/025* (2013.01); *H04W 4/029* (2018.02); *H04W 4/40* (2018.02); *H04W 52/0225* (2013.01); *H04W 52/0274* (2013.01); *H04W 64/003* (2013.01)

(58) Field of Classification Search
USPC .................... 455/456.1, 450, 509, 551, 41.2
See application file for complete search history.

(56) References Cited

U.S. PATENT DOCUMENTS

| | | | | |
|---|---|---|---|---|
| 9,285,944 | B1* | 3/2016 | Penilla | G06Q 20/18 |
| 9,420,406 | B2* | 8/2016 | Chen | G08C 17/02 |
| 9,467,515 | B1* | 10/2016 | Penilla | G06Q 20/18 |
| 9,648,107 | B1* | 5/2017 | Penilla | H04L 67/12 |
| 9,680,957 | B2* | 6/2017 | Bergmann | H04L 67/2847 |
| 9,919,647 | B2* | 3/2018 | Chen | B60W 50/16 |
| 10,107,638 | B2* | 10/2018 | Lem | B60N 2/976 |
| 2004/0252020 | A1* | 12/2004 | Matsumoto | B60T 8/17557 340/438 |
| 2007/0050110 | A1* | 3/2007 | Kondoh | B60K 31/18 701/36 |
| 2007/0109120 | A1 | 5/2007 | Schaefer | |
| 2010/0141427 | A1 | 6/2010 | Mott | |
| 2012/0040653 | A1 | 2/2012 | Mendis | |
| 2013/0225204 | A1 | 8/2013 | Mathews | |
| 2014/0045547 | A1 | 2/2014 | Singamsetty et al. | |
| 2015/0177362 | A1* | 6/2015 | Gutierrez | B60R 25/245 701/519 |
| 2015/0246639 | A1* | 9/2015 | Nagata | B60Q 9/008 340/435 |
| 2015/0309562 | A1* | 10/2015 | Shams | G06F 3/011 345/8 |
| 2016/0044129 | A1* | 2/2016 | Bergmann | H04L 67/2847 455/406 |
| 2016/0152211 | A1* | 6/2016 | Owens | B60R 25/102 348/36 |
| 2016/0300417 | A1* | 10/2016 | Hatton | G07C 9/00857 |
| 2017/0197617 | A1* | 7/2017 | Penilla | B60W 30/09 |
| 2018/0215344 | A1* | 8/2018 | Santora | B60R 25/102 |

OTHER PUBLICATIONS

Chin-Heng LIm, et. al., "A Real-Time Indoor WiFi Localization System Utilizing Smart Antennas", in Consumers Electronics, IEEE Transactions on Consumer Electronics, vol. 53, Issue: 2, May 2007, pp. 618-622 (2 page abstract).

International Search Report and Written Opinion of the International Search Authority dated Apr. 8, 2016 regarding International Application No. PCT/US2015/064580 (14 pages).

* cited by examiner

ALERT FOR LEFT-BEHIND MOBILE DEVICE

CROSS-REFERENCE TO RELATED APPLICATIONS

This application claims priority to International Application No. PCT/US2015/064580 titled "ALERT FOR LEFT-BEHIND MOBILE DEVICE" filed on Dec. 9, 2015, the contents of which are hereby incorporated by reference in their entirety.

BACKGROUND

Many people keep mobile phones nearby all the time. While in an automobile, it is likely that one or more passengers has a mobile phone with him or her. Many mobile phones and automobiles offer the ability to pair the mobile phone with a vehicle infotainment system. Further, the mobile phone can pair with other electronic devices unrelated to the operation of the automobile.

DETAILED DESCRIPTION

Figure 1:
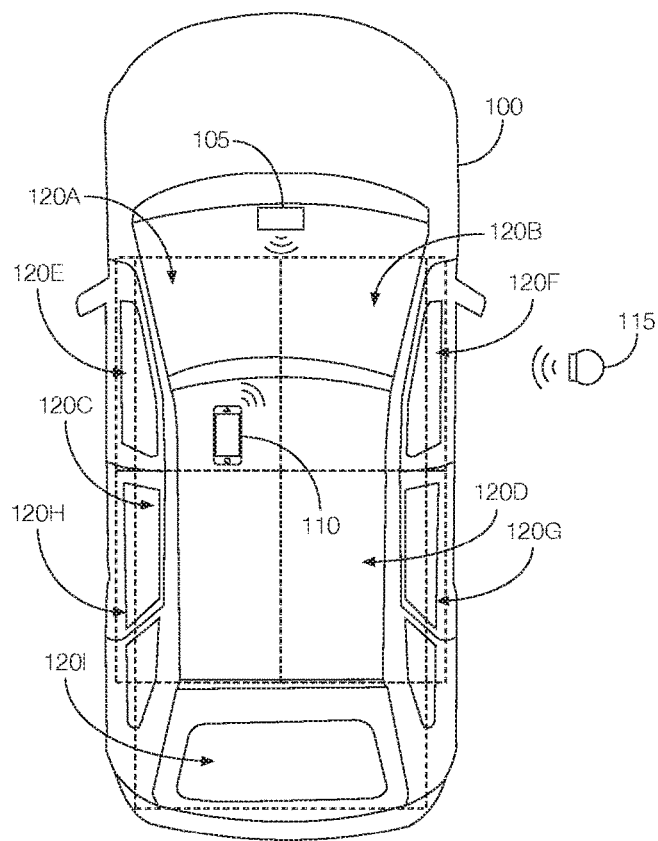
FIG. 1 illustrates an example vehicle having a device detection system paired with a mobile device that is paired with a wearable device.

People sometimes inadvertently leave their mobile devices, such as mobile phones or tablet computers, in their vehicles. Mobile devices are occasionally left in a center console, plugged into a charger, plugged into a dock or mount, etc. In other instances, the mobile device may fall out of the owner's pocket onto the floor of the vehicle or between the seats. The owner of the mobile device may not realize that the mobile device was left behind until after owner has walked away from the vehicle.

One way to address this problem is for the mobile device to communicate to the owner that it has been left behind in a vehicle. For instance, the vehicle, the mobile device, and another device carried by the owner, such as a wearable device (e.g., a smartwatch), can communicate with one another when the mobile device is left behind in the vehicle. An example vehicle system that can facilitate such communication includes a communication device programmed to pair with the mobile device and a processing device programmed to periodically transmit, to the mobile device, a present location signal representing a present location of the mobile device inside or near the vehicle. The processing device is further programmed to detect a vehicle shutdown and transmit a final location signal to the mobile device. The final location signal represents a final location of the mobile device (i.e., the location of the mobile device at the time of the vehicle shutdown) and a shutdown flag. The mobile device may interpret receipt of the shutdown flag as confirmation that the vehicle is turned off, suggesting that the owner is likely to walk away from the vehicle shortly.

The wearable device, which may be paired with the mobile device, may periodically receive location information from the mobile device and determine whether the mobile device is getting further away from the wearable device based on, e.g., a signal strength of the mobile device relative to the wearable device. It may be assumed that the wearable device and mobile device would be kept close by when carried by the owner. A gradual decrease in the signal strength, therefore, may suggest that the mobile device is getting further and further away from the wearable device. And since the owner is not likely to remove the wearable device while in the vehicle, the gradual decrease in signal strength may suggest that the mobile device, and not the wearable device, was left behind in the vehicle. Accordingly, the wearable device may alert the owner that the mobile device was left behind in the vehicle. Because the wearable device received location information from the mobile device, the wearable device can also instruct the owner of the last known location of the mobile device in the vehicle, which as discussed above could include the final location determined by the vehicle.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the host vehicle 100 includes a device detection system 105 that can wirelessly pair with a mobile device 110, such as a smartphone or tablet computer, which is in turn wirelessly paired with a wearable device 115, such as a smartwatch, fitness tracker, or the like. The host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle that can operate in an autonomous (e.g., driverless) mode, a partially autonomous mode, and/or a non-autonomous mode.

The device detection system 105 may be programmed to detect the location of the mobile device 110 inside or near the host vehicle 100. Using signal processing, the device detection system 105 may be programmed to determine a signal strength indicator, such as a Received Signal Strength Indicator (RSSI), associated with wireless communications with the mobile device 110. Based on the signal strength indicator, the device detection system 105 may determine where the mobile device 110 is located inside or around the host vehicle 100. Technologies, such as WiFi localization utilizing smart antennas, can be implemented in the host vehicle 100. See, for example, Chin-Heng Lim; Yahong Wan; Ng, Boon-Poh; See, C.-M. S., "A Real-Time Indoor WiFi Localization System Utilizing Smart Antennas," in *Consumer Electonics, IEEE Transactions on*, vol. 53, no. 2, pp. 618-622, May 2007 and Asis Nasipuri and Kai Li. 2002. A directionality based location discovery scheme for wireless sensor networks. In *Proceedings of the 1st ACM international workshop on Wireless sensor networks and applications* (WSNA '02). ACM, New York, N.Y., USA, 105-111. The host vehicle 100 may be virtually divided into segments 120, and the signal strength indicator may be used by the device detection system 105 to determine in which segment 120 the mobile device 110 is located. The segments 120 may have different sizes and characteristics. Nine segments 120 are shown in FIG. 1. For instance, the segments 120A-D may correspond to the driver seat, front passenger seat, rear passenger seat (driver's side), and rear passenger seat (passenger side), respectively. Other segments 120E-H may correspond to pockets near the driver door, front passenger door, rear passenger door (driver's side), and rear passenger door (passenger side). The ninth segment 120I may correspond to a trunk area. Other segments may correspond to other areas, including areas outside the host vehicle 100. Using the signal strength indicator, and possibly other signal characteristics, the device detection system 105 may determine the location of the mobile device 110 inside the host vehicle 100. The device detection system 105 may periodically transmit the determined location, via a present location signal, to the mobile device 110.

In some instances, the device detection system 105 may be programmed to detect when the host vehicle 100 is shutting down. A vehicle shutdown may occur when, e.g., the vehicle key is turned to an "off" position or the driver presses an "off" button, followed by a driver side door open event. A vehicle shutdown may also occur because the driver indicates his or her desire for the vehicle to power down, such as saying a voice command to instruct the vehicle 100 to shutdown. In response to detecting the vehicle shutdown, and prior to the shutdown completing, the device detection system 105 may be programmed to determine the final location of the mobile device 110. The final location may be the last location determined by the device detection system 105 before the host vehicle 100 was powered down. The device detection system 105 may transmit the final location, via a final location signal, along with a shutdown flag to the mobile device 110.

The mobile device 110 may be programmed to wirelessly receive the present location signals, representing the present location of the mobile device 110 at the time the signal was generated, as well as the final location signal and the shutdown flag from the device detection system 105. The final location signal may represent the location of the mobile device 110 at the time the shutdown of the host vehicle 100 was initiated. The mobile device 110 may store the final location in a data storage medium. Further, the mobile device 110 may be programmed to collect battery information representing the charge of its battery. Further, the mobile device 110 may be programmed to determine, from the shutdown flag, that the host vehicle 100 has powered down and that no more location signals will be sent. In response to receiving the final location signal, therefore, the mobile device 110 may transmit its final location, as determined by the device detection system 105, to the wearable device 115. The mobile device 110 may further transmit the battery information and the shutdown flag to the wearable device 115 after receiving the final location signal from the device detection system 105.

The wearable device 115 may be programmed to receive the final location, battery information, and shutdown flag from the mobile device 110. In response, the wearable device 115 may determine whether it is still wirelessly paired with the mobile device 110. The wireless communication between the wearable device 115 and the mobile device 110 may have a limited range. Therefore, the wearable device 115 may not be able to communicate with the mobile device 110 once the wearable device 115 and mobile device 110 are out of the communication range. In response to determining that it is no longer paired with the mobile device 110, the wearable device 115 may be programmed to generate an alert and display the alert to the owner of the wearable device 115 and the mobile device 110. The alert may include an audible, visual, or haptic alert to get the owner's attention. The alert may further include text that identifies the final location of the mobile device 110. Thus, not only may the alert indicate that the mobile device 110 was left behind in the host vehicle 100, it may further indicate the segment 120 where it was last detected before the host vehicle 100 was powered down.

To prevent false alerts, which may occur if communication is broken between the mobile device 110 and the wearable device 115 for reasons other than distance, the wearable device 115 may be programmed to consider the battery information received from the mobile device 110. Consulting the battery information may permit the wearable device 115 to determine whether the loss of communication with the mobile device 110 was the result of, e.g., the mobile device 110 losing battery power. In addition or in the alternative, the wearable device 115 may consider the change in signal strength relative to the mobile device 110 to determine if the mobile device 110 was likely left behind in the host vehicle 100. For instance, a signal strength profile, which may define the change in signal strength, may indicate that the wearable device 115 is moving away from the mobile device 110 if the change in signal strength is gradually decreasing. An abrupt change in signal strength, however, may suggest that the mobile device 110 lower power, which may be confirmed by the battery information.

Figure 2:
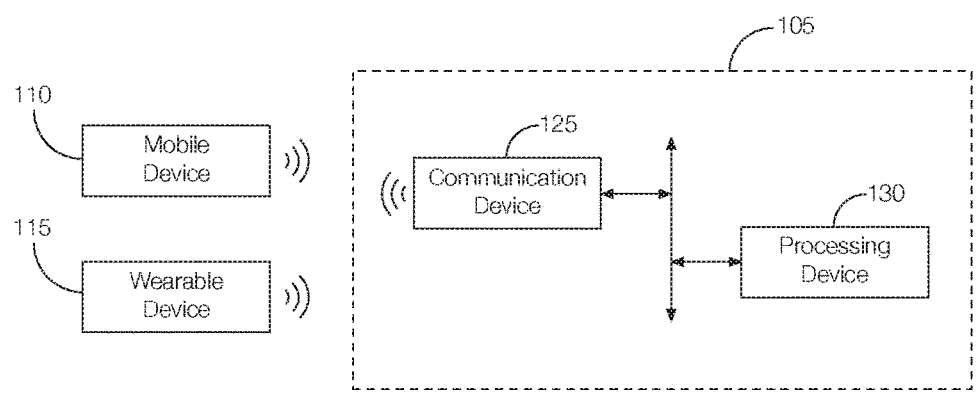
FIG. 2 is block diagram of the example device detection system incorporated into the vehicle of FIG. 1.

Referring now to FIG. 2, the device detection system 105 may include a communication device 125 and a processing device 130. The communication device 125 may include a data storage medium and a processor. The processor incorporated into the communication device 125 may be programmed to access and execute computer-executable instructions associated with communications with the mobile device 110, the wearable device 115, or both stored on the data storage medium. The communication device 125, therefore, may be programmed to pair with the mobile device 110 while the mobile device 110 is in or near the host vehicle 100. The communication device 125 may be configured to communicate in accordance with any number of radio frequency communication protocols such as such as Bluetooth®, Bluetooth® Low Energy, or WiFi. The communication device 125 may be programmed to transmit signals to, and received signals from, the processing device 130. Further, the communication device 125 may be programmed to facilitate communications to or from the mobile device 110, the wearable device 115, or both. That is, the communication device 125 may be programmed to receive signals from the mobile device 110, the wearable device 115, or both. The communication device 125 may pass signals received from the mobile device 110, the wearable device 115, or both, to the processing device 130. The signals may include a strength indicator, such as a Received Signal Strength Indicator (RSSI).

The processing device 130 may include a data storage medium and a processor. The processor incorporated into the processing device 130 may be programmed to access and execute computer-executable instructions associated with determining the location of the mobile device 110 in the host vehicle 100 stored on the data storage medium. For instance, the processing device 130 may receive signals output by the communication device 125 and determine the location of the mobile device 110 inside or near the host vehicle 100 based on, e.g., a signal strength of the signals received from the mobile device 110. For instance, the processing device 130 may be programmed to receive the strength indicator from the communication device 125. The strength indicator may identify where, relative to the host vehicle 100, the mobile device 110 is located. For instance, a relatively strong signal strength indicator may suggest that the mobile device 110 is near the communication device 125. Thus, the signal strength indicator may indicate whether the mobile device 110 is in the front or rear part of the passenger compartment. In some instances, the signal strength may be reduced if, e.g., the mobile device 110 is in a pocket in one of the doors. Further, the direction of the signal may indicate whether the mobile device 110 is on the driver or passenger side. Therefore, by analyzing the signal strength indicator utilizing object localization technologies with smart antennas, and directionality associated with the received signal, the processing device 130 may determine the most likely location of the mobile device 110. Once the present location of the mobile device 110 is determined, the processing device 130 may generate a present location signal that includes the present location and command the communication device 125 to transmit the present location signal to the mobile device 110.

Since the location of the mobile device 110 may change, the processing device 130 may be programmed to periodically determine the location of the mobile device 110 while the host vehicle 100 is in use. Thus, if the mobile device 110 is moved from the owner's pocket to the center console while the host vehicle 100 is in operation, the processing device 130 will detect the movement and transmit the present location signal with the new location.

The processing device 130 may be programmed to only operate while the host vehicle 100 is in operation. Therefore, the processing device 130 may be programmed to determine the final location of the mobile device 110 at the time of the vehicle shutdown. In one possible implementation, the processing device 130 may be programmed to detect the vehicle shutdown, determine the final location of the mobile device 110 at the time of the vehicle shutdown, generate a final location signal that identifies the final location of the mobile device 110 (i.e., the location at the time of the vehicle shutdown), and command the communication device 125 to transmit the final location signal to the mobile device 110.

The processing device 130 may be further programmed to generate the final location signal to include a shutdown flag. The shutdown flag may indicate to the mobile device 110 that the host vehicle 100 is powering down and that no position signals will be transmitted until the host vehicle 100 is powered up again with the mobile device 110 inside or nearby. Further, in some instances, the processing device 130 may command the communication device 125 to transmit the final location signal to the wearable device 115, if paired with the device detection system 105, so that the wearable device 115 also knows that the final location of the mobile device 110 has been determined and so the wearable device 115 can begin to determine whether the mobile device 110 was left behind in the host vehicle 100.

With its final location determined, the mobile device 110 may communicate directly with the wearable device 115, including transmitting the final location and shutdown flag to the wearable device 115, transmitting battery information to the wearable device 115, etc., as discussed in greater detail below.

Figure 3:
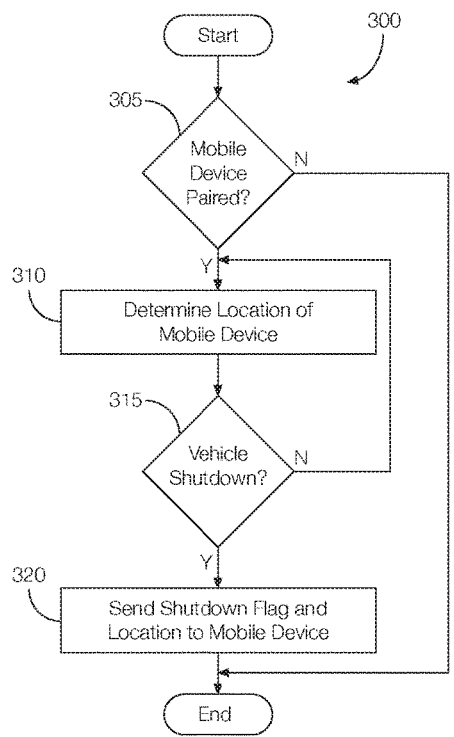
FIG. 3 is a flowchart of an example process that may be executed by the device detection system.

FIG. 3 is a flowchart of an example process 300 that may be executed by the device detection system 105. For instance, the process 300 may begin when the vehicle is turned on and end after the vehicle shutdown process begins.

At decision block 305, the device detection system 105 may determine whether it has paired with a mobile device 110. The communication device 125 may pair with the mobile device 110 using an RF-based communication protocol such as Bluetooth®, Bluetooth® Low Energy, or WiFi. The processing device 130 may detect the pairing based on signals received by the communication device 125. If the pairing is detected, the process may proceed to block 310. If no pairing is detected, the process 300 may end (as shown in FIG. 3) or may continue to execute block 305 until a pairing occurs.

At block 310, the device detection system 105 may determine the location of the mobile device 110 relative to the host vehicle 100. The location of the mobile device 110 may be determined by processing the signals received via the communication device 125. For instance, from the signals received by the communication device 125 from the mobile device 110, the processing device 130 may determine a signal strength indicator, such as a Received Signal Strength Indicator (RSSI), associated with wireless communications with the mobile device 110. Based on the signal strength indicator, the processing device 130 may determine where the mobile device 110 is located inside or around the host vehicle 100. As discussed above, the host vehicle 100 may be virtually divided into segments 120, and the signal strength indicator, as well as a directionality characteristic associated with the received signal, may be analyzed using, for instance, object localization technologies with smart antennas via, e.g., the techniques described in the papers mentioned above by the processing device 130 to determine in which segment 120 the mobile device 110 is located. The segments 120 may have different sizes and characteristics, as discussed above.

At decision block 315, the device detection system 105 may determine whether the vehicle shutdown has begun. The vehicle shutdown may occur when, e.g., the vehicle key is turned to an "off" position, the driver presses an "off" button, or the driver otherwise indicates his or her desire for the vehicle to power down, such as by saying a voice command to the vehicle speech recognition system. The processing device 130, therefore, may determine that the vehicle shutdown has begun based on a signal received from a vehicle ignition system or other vehicle system. If the vehicle shutdown is detected, the process 300 may proceed to block 320. Otherwise, the process 300 may return to block 310 so that the location of the mobile device 110 may be periodically reevaluated. Accordingly, a delay may occur prior to the process 300 returning to block 310.

At block 320, the device detection system 105 may generate the final location signal and send the final location signal to the mobile device 110, the wearable device 115, or both. The processing device 130 may generate the final location signal to include the final location of the mobile device 110 (which could be the last location determined at block 310 or new location determined at block 320) and the shutdown flag, which may indicate to the mobile device 110 and wearable device 115 that the host vehicle 100 is shutting down and that no more location determinations will be made.

The process 300 may end after block 320.

Figure 4:
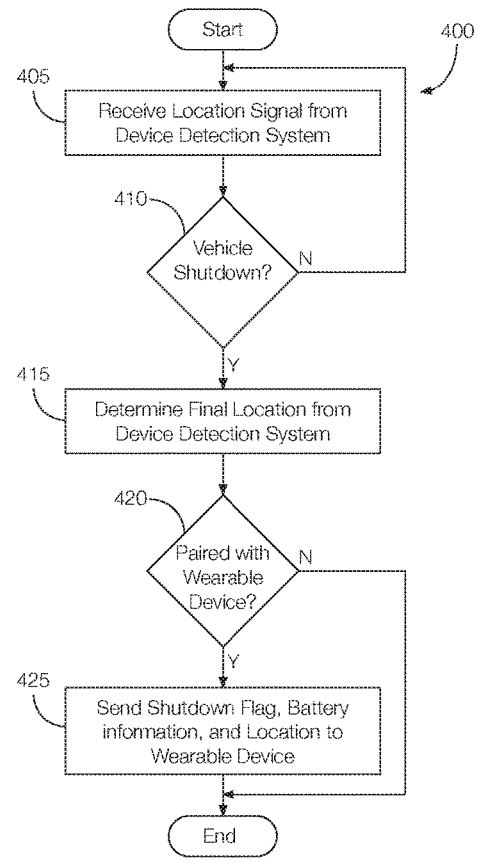
FIG. 4 is a flowchart of an example process that may be executed by the mobile device.

FIG. 4 is a flowchart of an example process 400 that may be executed by the mobile device 110. The process 400 may begin when the host vehicle 100 is running and paired with the mobile device 110, and may continue to execute until the mobile device 110 has communicated its final location, the shutdown flag, and battery information to the wearable device 115.

At block 405, the mobile device 110 may receive the location signal transmitted by the device detection system 105. The location signal may include the present location signal, which may indicate the present location of the mobile device 110 in the host vehicle 100, or a final location signal, which may indicate the final location of the mobile device 110 at the time of the vehicle shutdown as well as the shutdown flag.

At decision block 410, the mobile device 110 may determine whether the host vehicle 100 is powering down. The mobile device 110 may determine whether the host vehicle 100 is powering down based on signals received from the host vehicle 100. For instance, the mobile device 110 may determine that the host vehicle 100 is powering down if the shutdown flag is received from the host vehicle 100 at block 405. Therefore, if the shutdown flag is received at block 405, the process 400 may proceed to block 415. Otherwise, the process 400 may return to block 405 to await another location signal.

At block 415, the mobile device 110 may determine its final location relative to the host vehicle 100 as determined by the device detection system 105. When the final location signal is received, it may include the final location of the mobile device 110, the shutdown flag, or both. The mobile device 110 may extract the final location from the final location signal to determine its final location relative to the host vehicle 100.

At decision block 420, the mobile device 110 may determine whether it is paired with a wearable device 115. If so, the process 400 may proceed to block 425. Otherwise, the process 400 may end.

At block 425, the mobile device 110 may transmit the shutdown flag, battery information, and final location to the wearable device 115. This data may be transmitted relatively quickly after the mobile device 110 receives the shutdown flag while the wearable device 115 is still in range of the mobile device 110 in case the mobile device 110 is left behind in the host vehicle 100. After the shutdown flag, battery information, and final location have been transmitted to the wearable device 115, the process 400 may end.

Figure 5:
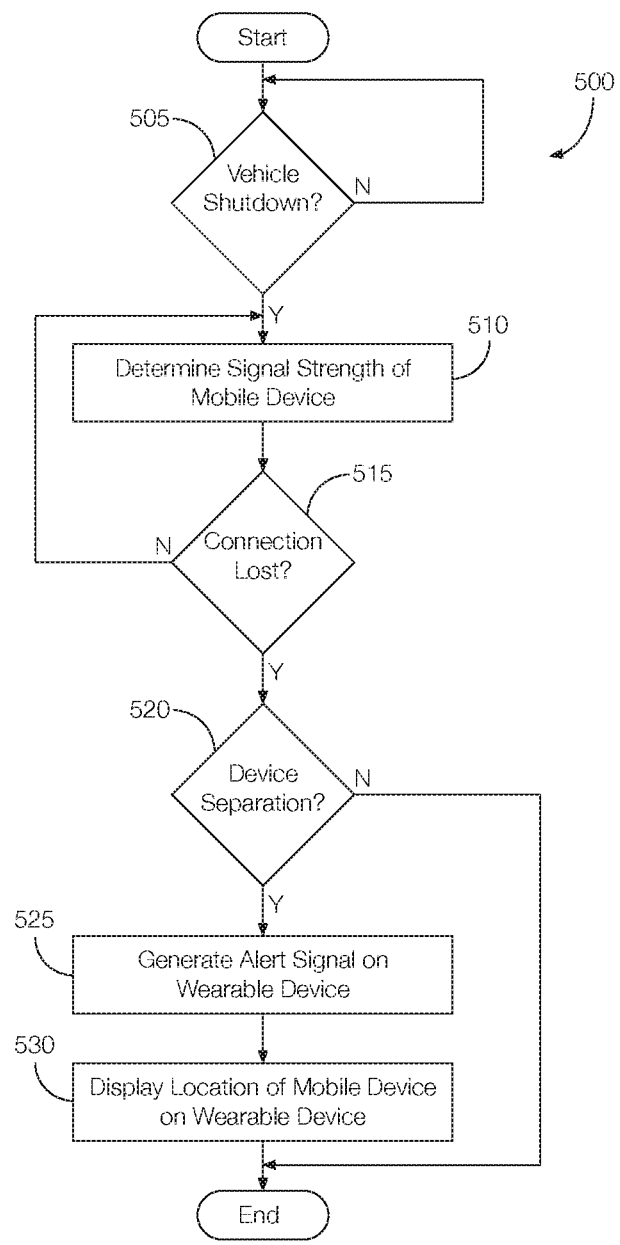
FIG. 5 is a flowchart of an example process that may be executed by the wearable device.

FIG. 5 is a flowchart of an example process 500 that may be executed by the wearable device 115. The process 500 may begin prior to the wearable device 115 determining that the host vehicle 100 is powering down and may continue to execute until the wearable device 115 has alerted its owner that the mobile device 110 was inadvertently left behind in the host vehicle 100. In some possible implementations, the process 500 may begin when the wearable device 115 first receives location information from the mobile device 110. The location information may include the present or final location of the mobile device 110 relative to the host vehicle 100. Further, the wearable device 115 may receive the shutdown flag and the battery information associated with the mobile device 110.

At decision block 505, the wearable device 115 may determine whether the host vehicle 100 is powering down. The wearable device 115 may determine whether the host vehicle 100 is powering down based on signals received from the host vehicle 100, from the mobile device 110, or both. For instance, wearable device 115 may determine that the host vehicle 100 is powering down if the shutdown flag is received from the mobile device 110. If the shutdown flag is received at block 505, the process 500 may proceed to block 510. Otherwise, the process 500 may continue to execute block 505, after a short delay, until the shutdown flag is received.

At block 510, the wearable device 115 may determine the signal strength of the mobile device 110. The signal strength may be based on a strength indicator, such as the Received Signal Strength Indicator (RSSI) associated with communications between the mobile device 110 and the wearable device 115. Because the wearable device 115 and mobile device 110 are paired, the wearable device 115 may continually or at least periodically determine the signal strength of the mobile device 110. By continually or periodically determining the signal strength, the wearable device 115 may determine whether the wearable device 115 is gradually moving further away from the mobile device 110. The distance of the mobile device 110 relative to the wearable device 115 may be proportional to the signal strength, so a gradual (linear or exponential) decrease in signal strength may suggest a gradual increase in distance between the mobile device 110 and wearable device 115.

At decision block 515, the wearable device 115 may determine whether the connection with the mobile device 110 has been lost. The lost connection may be detected when, e.g., the wearable device 115 and mobile device 110 are no longer within a communication range. If the connection is lost, the process 500 may proceed to block 520. If the connection remains, the process 500 may return to block 510 so that the signal strength may be continually or periodically measured.

At decision block 520, the wearable device 115 may determine whether the connection was lost because of device separation (e.g., the wearable device 115 was moved away from the mobile device 110) as opposed to the mobile device 110 losing battery power. For instance, if the signal strength of the mobile device 110 gradually decreases prior to losing the connection to the wearable device 115, and if the battery information transmitted from the mobile device 110 is above a predetermined level that indicates that the mobile device 110 battery was sufficiently charged at the time of the vehicle shutdown to continue to communicate with the wearable device 115, the wearable device 115 may determine that the communication loss was due to the wearable device 115 moving out of range of the mobile device 110 and not a power loss of the mobile device 110. If the connection lost is related to the mobile device 110 being out of communication range of the wearable device 115, the process 500 may proceed to block 525. Otherwise, the process 500 may end.

At block 525, the wearable device 115 may generate an alert signal. The alert signal may include the final location of the mobile device 110 relative to the host vehicle 100 as determined by the device detection system 105. The alert signal may further indicate that the mobile device 110 is no longer paired with the wearable device 115.

At block 530, the wearable device 115 may output the alert signal as a notification that includes the location of the mobile device 110. The notification may be presented on, e.g., a user interface device incorporated into the wearable device 115. The notification may further include an audible, visible, or haptic alert to help get the attention of the person wearing the wearable device 115. In some instances, the notification may be periodically output by the wearable device 115 until acknowledged by the owner (e.g., the owner presses a button to turn off the alerts) or until the wearable device 115 is able to pair with the mobile device 110 or otherwise determines that the mobile device 110 is no longer left behind in the host vehicle 100.

The process 500 may end after block 530.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:
1. A vehicle system comprising:
 a communication device programmed to pair with a mobile device; and
 a processing device programmed to periodically transmit, to the mobile device, a present location signal representing a present location of the mobile device, wherein the processing device is programmed to detect a vehicle shutdown and transmit a final location signal to the mobile device, the final location signal representing a final location of the mobile device and a shutdown flag;

wherein the processing device is programmed to detect the present location and the final location of the mobile device inside the vehicle, based at least in part on a signal strength indicator, the final location including one of a vehicle passenger compartment front or rear, a pocket in a vehicle door, or a vehicle passenger compartment console.

2. The vehicle system of claim 1, wherein the shutdown flag indicates that a host vehicle is powering down.

3. The vehicle system of claim 1, wherein the processing device is programmed to detect the present location and the final location of the mobile device in the vehicle.

4. The vehicle system of claim 3, wherein the processing device is programmed to detect the present location and the final location of the mobile device based at least in part on a signal strength indicator.

5. The vehicle system of claim 4, wherein the signal strength indicator is based on a signal strength of a signal transmitted from the mobile device and received by the communication device.

6. The vehicle system of claim 1, wherein the mobile device is programmed to transmit the final location and the shutdown flag to a wearable device.

7. The vehicle system of claim 1, wherein the mobile device is programmed to transmit battery information to a wearable device.

8. The vehicle system of claim 1, wherein the communication device is programmed to transmit the final location of the mobile device and the shutdown flag to a wearable device.

9. The vehicle system of claim 1, wherein the communication device is programmed to receive battery information from the mobile device and transmit the battery information to a wearable device.

10. A method comprising:
pairing a wearable device to a mobile device;
receiving, via the wearable device, location information representing a location of the mobile device relative to a host vehicle, wherein the location is a location of the mobile device inside the vehicle, based at least in part on a signal strength indicator, the location including one of a vehicle passenger compartment front or rear, a pocket in a vehicle door, or a vehicle passenger compartment console;
determining whether the mobile device is still paired with wearable device;
generating, via the wearable device, an alert if the mobile device is no longer paired with the wearable device; and
displaying, via the wearable device, the location of the mobile device relative to the host vehicle in response to the generating the alert.

11. The method of claim 10, further comprising determining whether the mobile device is still paired with the wearable device based at least in part on a signal strength of a signal transmitted from the mobile device.

12. The method of claim 10, further comprising determining whether a distance between the mobile device and the wearable device is increasing based at least in part on a change in signal strength of a signal transmitted from the mobile device.

13. The method of claim 12, further comprising determining that the distance is increasing if the signal strength decreases.

14. The method of claim 12, further comprising:
receiving, via the wearable device, battery information associated with the mobile device; and
determining that the distance is increasing if the battery information indicates that a battery of the mobile device is charged above a predetermined level.

15. A non-transitory computer readable medium storing a software program, the software program being executable by a processor of a computing device to provide operations comprising:
pairing a wearable device to a mobile device;
receiving, via the wearable device, location information representing a location of the mobile device relative to a host vehicle, wherein the location is a location of the mobile device inside the vehicle, based at least in part on a signal strength indicator, the location including one of a vehicle passenger compartment front or rear, a pocket in a vehicle door, or a vehicle passenger compartment console;
determining whether the mobile device is still paired with wearable device;
generating, via the wearable device, an alert if the mobile device is no longer paired with the wearable device; and
displaying, via the wearable device, the location of the mobile device relative to the host vehicle in response to the generating the alert.

16. The computer-readable medium of claim 15, the operations further comprising determining whether the mobile device is still paired with the wearable device based at least in part on a signal strength of a signal transmitted from the mobile device.

17. The computer-readable medium of claim 15, the operations further comprising determining whether a distance between the mobile device and the wearable device is increasing based at least in part on a change in signal strength of a signal transmitted from the mobile device.

18. The computer-readable medium of claim 17, the operations further comprising determining that the distance is increasing if the signal strength decreases.

19. The computer-readable medium of claim 17, the operations further comprising:
receiving, via the wearable device, battery information associated with the mobile device; and
determining that the distance is increasing if the battery information indicates that a battery of the mobile device is charged above a predetermined level.

* * * * *